May 7, 1946.  L. RADFORD  2,400,059
INSTRUMENT FOR MEASURING RANGE AND ALTITUDE
Filed Sept. 15, 1931  5 Sheets-Sheet 1

INVENTOR.
Lawrence Radford
BY
ATTORNEYS.

May 7, 1946.  L. RADFORD  2,400,059
INSTRUMENT FOR MEASURING RANGE AND ALTITUDE
Filed Sept. 15, 1931  5 Sheets-Sheet 4

INVENTOR.
Lawrence Radford
BY
ATTORNEYS.

May 7, 1946.  L. RADFORD  2,400,059
INSTRUMENT FOR MEASURING RANGE AND ALTITUDE
Filed Sept. 15, 1931  5 Sheets-Sheet 5

INVENTOR.
Lawrence Radford
BY
ATTORNEYS.

Patented May 7, 1946

2,400,059

UNITED STATES PATENT OFFICE 2,400,059

INSTRUMENT FOR MEASURING RANGE AND ALTITUDE

Lawrence Radford, Washington, D. C.

Application September 15, 1931, Serial No. 562,986

13 Claims. (Cl. 88—2.7)

(Granted under the act of March 3, 1883, as amended April 30, 1928; 370 O. G. 757)

This invention relates to that class of instruments of the rangefinder type that are adapted for use in determining the altitude of an object above the horizontal plane passing through the instrument.

The principal object of this invention is to provide an improved and simplified apparatus for measuring either range or altitude.

Another object of this invention is to provide an apparatus for measuring either range or altitude with greater accuracy, and that is susceptible of more accurate adjustment.

For purposes of illustration, reference is made to the accompanying figures which show one embodiment of this invention.

Figure 9:
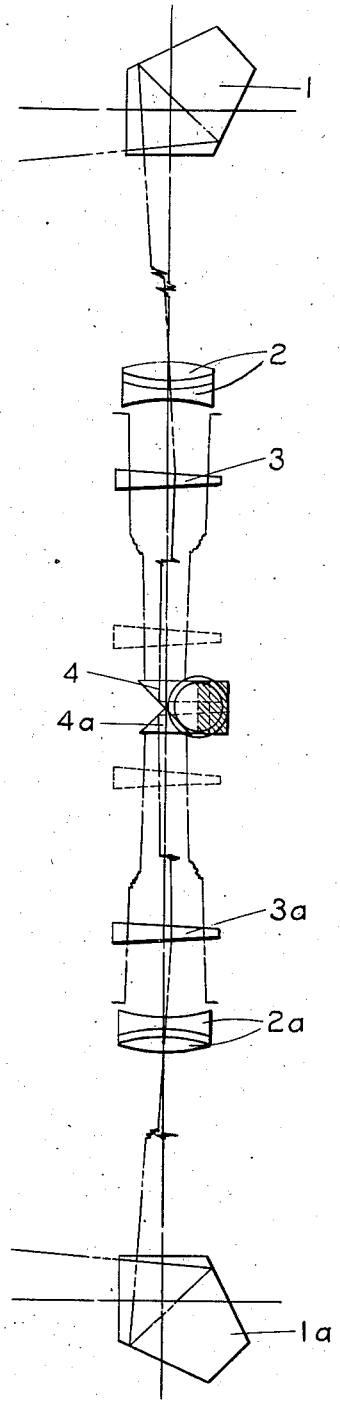
Figure 10:
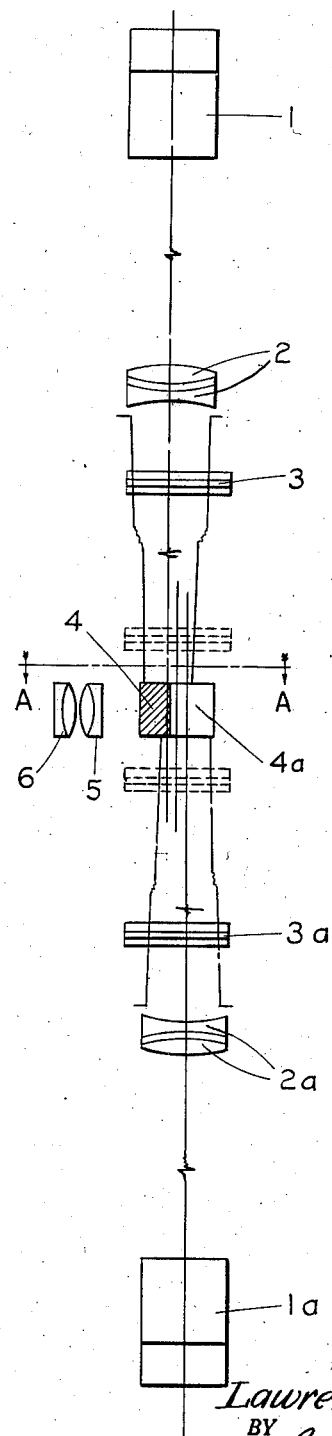
Figure 11:
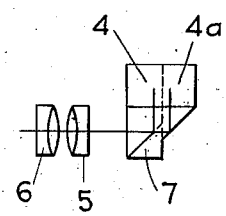

Figs. 9, 10 and 11 show views of the optical parts of the instrument. In Fig. 9 the line of sight to the target lies in the plane of the paper, with the target to the left, while in Fig. 10 the line of sight is perpendicular to the plane of the paper and the target is below the paper. Fig. 11 is a cross-section on line A—A of Fig. 10.

These figures illustrate an instrument of the same general type as the single-observer coincidence rangefinder with self-contained base, which is well known. Such a rangefinder consists essentially, as regards the optical features, of two telescopes with a common ocular. The embodiment of this invention which is illustrated in the accompanying figures, however, differs from the conventional type of rangefinder referred to in that the present invention embodies means whereby either the range or altitude of the target may be measured with the same instrument and means whereby these two quantities may be read from the same scale, in different units if so desired. The conventional type is usually mounted with its longitudinal axis horizontal whereas the instrument of my invention is mounted on a horizontal trunnion and the longitudinal axis of the instrument is perpendicular to the axis of said trunnion. Various other novel features and improvements are included which will be described more fully hereinafter.

Referring first to Figs. 9, 10 and 11, two pencils of light, each represented by a line in Fig. 9, from a distant object which, in the case of Fig. 9, is assumed to lie at the left and in the plane of the paper, enter the two pentagonal prisms 1 and 1a, respectively, as shown. The ray transmitted by objective 2 passes through wedge 3, the functions of which will be explained below, and is reflected twice in prism 4 and into the eyepiece consisting of lenses 5 and 6. Similarly the ray transmitted by objective 2a, after being transmitted through wedge 3a, is twice reflected in prism 4a, through a part of prism 7, into the same eyepiece, lenses 5 and 6. A part of the surface between prisms 4 and 7 is silvered, as shown by the heavy line in Fig. 11. Hence the observer, when looking into the eyepiece 5 and 6, sees a field divided into two halves along a line parallel to the longitudinal axis of the instrument.

Figure 1:
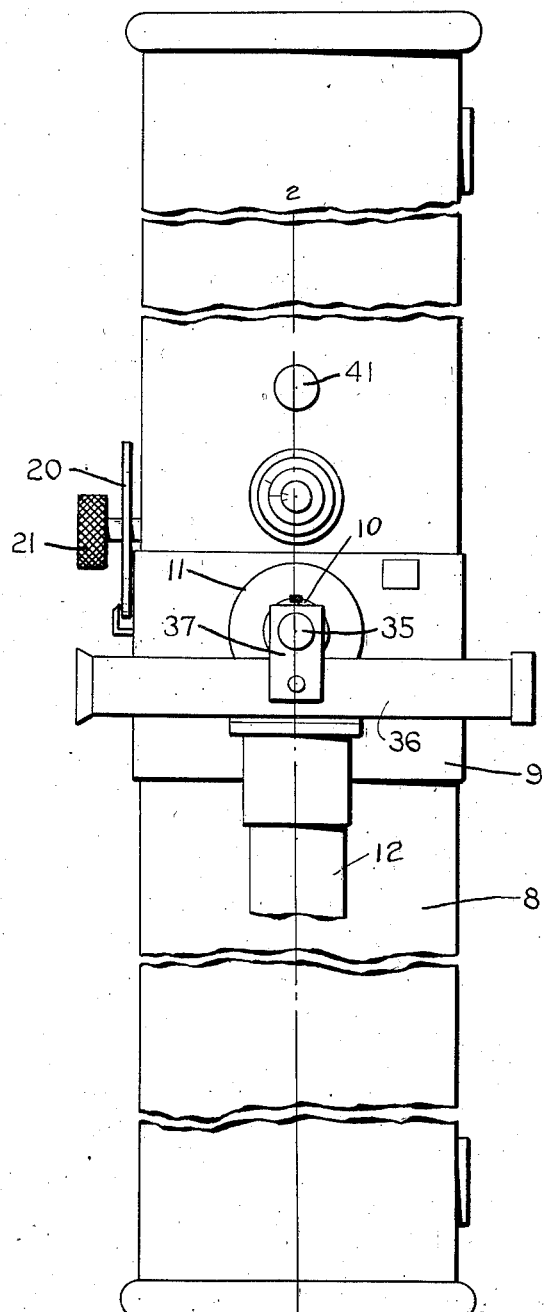
Fig. 1 is an external view of the instrument as seen by one facing in a direction 90° to the left of the target.
Figure 2:
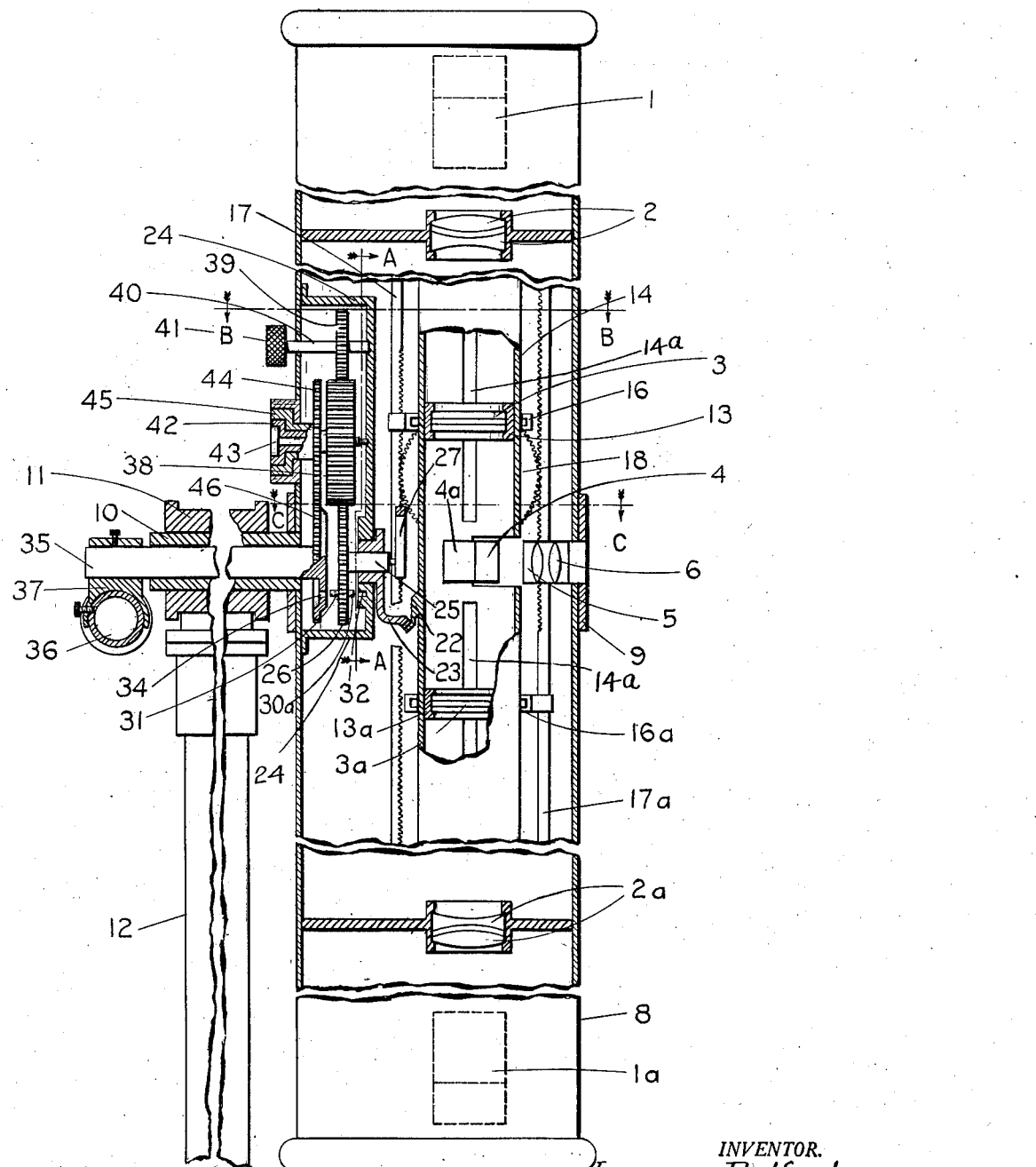
Fig. 2 is a cross-sectional view in a plane at right angles to the line of sight to the target, the target position being above the plane of the paper.

Referring now more particularly to Fig. 2, all of these optical parts are contained in a tubular casing 8 secured in a collar 9. To this collar is secured the trunnion 10 by means of which the instrument is supported in a bearing 11 on the pedestal 12, so that the instrument is rotatable about the axis of the trunnion for viewing objects at different angles of elevation.

Figure 3:
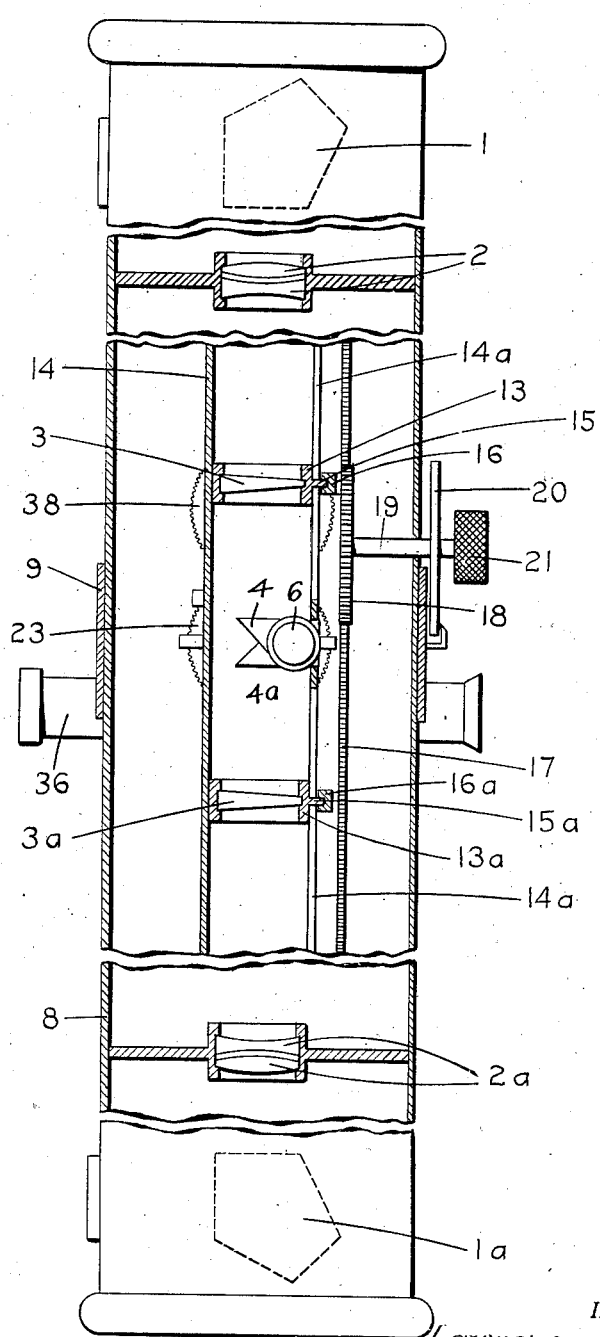
Fig. 3 is a cross-sectional view in a plane parallel to the line of sight to the target, the target being to the left.
Figure 4:
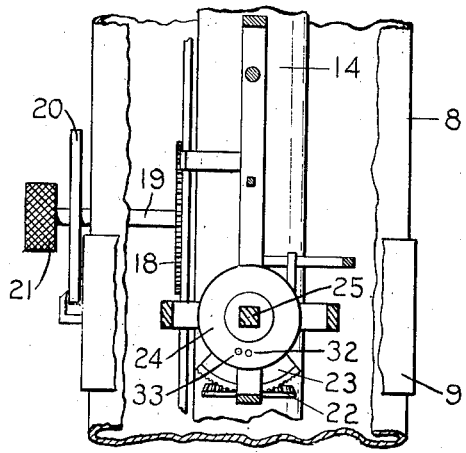
Fig. 4 is a sectional view of a portion of the instrument on line A—A of Fig. 2.
Figure 5:
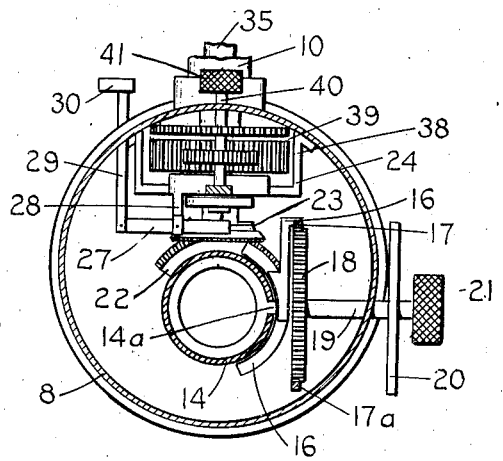
Fig. 5 is a cross-sectional view on line B—B of Fig. 2.
Figure 7:
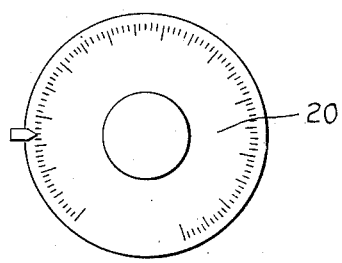
Fig. 7 is a view of the face of the scale.

As will be seen from Figs. 2 and 3, the wedges 3 and 3a are mounted in the carriers 13 and 13a, respectively. These carriers are adapted to slide longitudinally in the tube 14. This tube 14 is rotatable about its own longitudinal axis in bearings supported from tube 8, these bearings not being shown, to avoid confusion. Each of the wedge carriers 13 and 13a is provided with a stud, 15 and 15a respectively, seen in Fig. 3, which projects through a slot 14a in tube 14. Hence each of these carriers, and also each of the wedges 3 and 3a, rotates with tube 14. The end of stud 15 fits into a groove cut on the inside of piece 16, which piece is secured to the rack 17. Likewise the end of stud 15a fits into a groove in piece 16a which is secured to the rack 17a. The teeth on racks 17 and 17a mesh with teeth on the opposite sides of pinion 18. This pinion is secured to a shaft 19, seen in Figs. 3, 4 and 5, and on the other end of this shaft are secured the scale 20 and the knurled knob 21. Hence rotation of knob 21 causes the two wedges 3 and 3a to move along the axis of tube 14 through the same distance but in opposite directions. These parts are so proportional and adjusted that the wedges 3 and 3a are at all times at the same distance from objectives 2 and 2a, respectively, and at the same time these wedges are free to rotate with tube 14.

Figure 6:
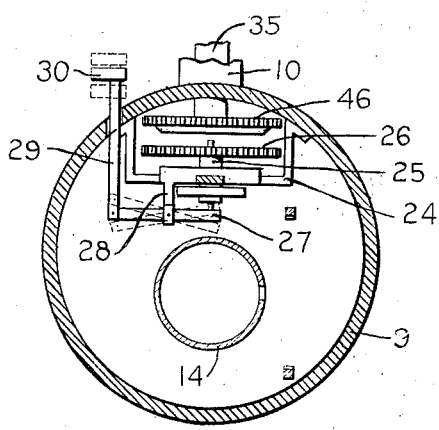
Fig. 6 is a cross-sectional view on line C—C of Fig. 2.

On a flange on tube 14 are cut gear teeth forming a sector of a bevel gear, 22, which meshes with a bevel gear sector 23. This gear 23 is rotatable in a bearing in frame 24 secured to the casing 8 and in the center of the hub of gear 23 is cut a square hole in which the square shaft 25 may slide. Pinion 26 is secured to this square shaft, and therefore gear 23 and pinion 26 rotate together. The inner end of the square shaft 25 is attached by means of a pin to the lever 27 (seen in Figs. 5 and 6) which is pivoted on an arm 28 which forms a part of the frame 24. The other end of this lever is connected by a pin to the push rod 29 which projects outside of the tubular case of the instrument and is provided with a handle 30. Therefore, when this handle 30 is pushed inward pinion 26 is moved outward and when handle 30 is pulled outward pinion 26 is moved closer to the centerline of the instrument.

On the opposite faces of pinion 26 are provided studs 30a and 31, seen in Fig. 2. When handle 30 is pulled outward stud 30a can be made to engage in either of two holes 32 and 33 in frame 24. When this stud enters either of these holes, tube 14 is locked. When handle 30 is pushed inward stud 31 on pinion 26 can be made to enter a hole 34 drilled in the disk which forms the inner end of shaft 35, and therefore when handle 30 is pushed inward and stud 31 enters the hole 34, pinion 23 rotates with shaft 35.

A telescope 36 is rigidly secured to shaft 35 by means of the clamp 37. Pinion 26 meshes with a pinion 38, the face of which is sufficiently wide so that it is always engaged with pinion 26 at all positions of the latter. Pinion 38 in turn meshes with a third pinion 39 which is secured to the shaft 40. This shaft projects outside of the casing 8 and is provided with a knurled operating knob 41. Hence by rotation of this knob, gear 23 (and therefore tube 14) can be rotated to any desired position provided neither of the studs 30 and 31 on pinion 26 is engaged in holes 32, 33 or 34.

Pinion 38 is secured to a hollow shaft 42 which rotates on a fixed shaft 43. The outer end of the fixed shaft 43 is in the form of a disk which fits into a recess in the enlarged outer end of the hollow shaft 42. A pinion 44 is keyed to a hollow shaft 45, which in turn rotates on the hollow shaft 42. The outer end of shaft 45 is also enlarged and is provided with a recess into which the enlarged part of shaft 42 fits. Pinion 44 meshes with a pinion 46 which is keyed to shaft 35.

Figure 8:
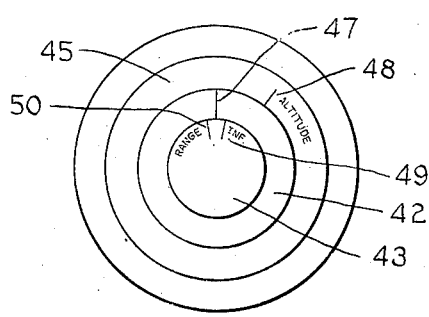
Fig. 8 is a view of the face of the indicator.

Referring now to Figure 8, a radial line 47 is engraved on the surface of the enlarged outer end of the hollow shaft 42, and a similar line 48 is engraved on the face of the enlarged outer end of the hollow shaft 45. On the face of the disk which forms the outer end of the fixed shaft 43 are engraved two radial lines 49 and 50. Line 49 is engraved in such position that when line 47 is in alignment with line 49 stud 30a is in line with the hole 32 in frame 24 and can be made to enter said hole by pulling handle 30 outward. Likewise when line 47 is in alignment with line 50 stud 30a can be made to enter hole 33 by means of handle 30. Since pinion 44 is always engaged with pinion 46, and pinion 38 with pinion 26, shaft 45 rotates through the same angle as, but in the reverse direction from, shaft 35, pinions 44 and 46 having the same number of teeth. Line 48 on the shaft 45 is so positioned that when it and line 47 are in alignment, stud 31 is in position to enter hole 34 on the disk forming the inner end of shaft 35, and can be engaged therein by pushing the handle 30 inward. Thus parts 42, 43 and 45, with the lines engraved thereon, together comprise an indicator whereby, by proper operation of the knob 41 and the handle 30, the operator of the instrument is able quickly to lock the tube 14 in either of two positions or to cause it to rotate with shaft 35.

As will be seen from Fig. 9, prisms 3 and 3a are in the shape of a wedge of very small angle, and consequently the light transmitted by each is deviated through a small angle. This deviation takes place in a plane perpendicular to the line in which the two plane faces of the wedge, if extended, would intersect. This plane in which the deviation takes place is hereinafter called the plane of deviation. Let $d$ represent the angle of deviation. If the instrument be rotated so that its longitudinal axis is vertical and directed at a target in the form of a horizontal line, the objectives 2 and 2a will form horizontal images of said target in the focal plane of the eyepiece 5—6. The image formed by objective 2 will be seen on one side of the dividing line in the field of view, and that formed by objective 2a on the other side. The various parts are so proportioned and adjusted that, if the target were at an infinite distance and if prisms 3 and 3a were removed, these two images would form a continuous line. If these prisms are in place, however, and if their plane of deviation is parallel to the lines of sight to the target, the two images of the target will be displaced in a direction parallel to the halving line but in opposite directions. The amount of this displacement is directly proportional to the distance of each of the wedges from the common focal plane of the objectives, and if this distance were made zero there would be no displacement. If now the target be assumed to be, not at an infinite distance, but at a finite distance, the rays of light entering the prisms I and Ia, respectively, are not parallel to each other, but diverge as they approach the instrument, and the relative displacement of the images is different for each target distance. The wedges 3 and 3a are so mounted that when their common plane of deviation is parallel to the lines of sight to the target, they cause displacement of the images in the direction opposite to the displacement caused by the divergence of the rays from the target. Hence for any target distance, within limits, prisms 3 and 3a may be moved along tube 14, without rotation, by means of knob 21, until the deviation of the two prisms exactly compensates for the displacement caused by the divergence of the rays from the target, i. e. until the two images are in alignment. Scale 20, which indicates the position of the prisms, is graduated in a scale of distances and therefore serves to indicate the distance or range of the target, which distance may be denoted by R.

This instrument may also be used to measure the altitude, i. e. the height in feet, of an aerial target at any angle of elevation of the line of sight to said target. First assume that the target is vertically above the instrument, i. e. that the angle of elevation is 90°. Then obviously R, which is the reading of the scale 20 when the images are in alignment as previously described, is equal to the altitude of the target, which may be denoted by H. Now assume that the angle of elevation, which may be denoted by $e$, is less than 90°. Then $$R = \frac{H}{\cos(90°-e)} \quad (1)$$

If B is the distance between the centers of the prisms 1 and 1a, the angle of divergence of the rays entering these two prisms, which may be denoted by $b$, is equal to $$\frac{B}{R} \quad (2)$$

and, in order to align the two images it is necessary to move the wedges 3 and 3a so that the deviation produced by each in the focal plane, in a direction parallel to the dividing line between the two halves of the field, is equal to one-half this angle of divergence. The displacement of each image parallel to the dividing line may be changed either by rotation or translation of the corresponding prism 3 or 3a. By combining Equations 1 and 2 above, it will be seen that $$b = \frac{B \cos(90°-e)}{H} \quad (3)$$

Since the value of B is constant, this equation shows that for a given value of H, the shifting of each image by wedge 3 or 3a necessary to bring the images into alignment, is proportional to cos (90°—$e$). Hence this shifting may be produced by rotating each wedge through the angle (90°—$e$) from that position in which its plane of deviation is parallel to the lines of sight to the target, since the movement parallel to the dividing line of the rays coming through the wedges is proportional to the cosine of the angle between the plane of deviation and the position which produces the maximum deviation parallel to the dividing line. This is because the adjustment of the wedges longitudinally in tube 14 to bring about coincidence of the images on opposite sides of the halving line after a change in the altitude of the target merely reduces the said separation to zero and will therefore necessarily have the same cos (90°—$e$) proportion, and so it is apparent that the altitude may be read directly on the scale 20. Therefore, since it is unnecessary to translate wedges 3 and 3a along tube 14 in order to maintain the images in alignment during changes in $e$, with H remaining constant, it will be seen that each position on scale 20 corresponds to a particular value of H. It will also be seen that, as the instrument is rotated on its trunnion 10 to follow a target as the angle of elevation ($e$) changes, maintenance of telescope 36 in a horizontal position, say by observation of the horizon, causes rotation of tube 14, by means of gears 22 and 23, through the same angle as 4 rotates. In other words, tube 14 is rotated through an angle which is equal to the change in (90°—$e$). This, as was pointed out above, is the angle through which it is necessary to rotate tube 14 in order to maintain the two parts of the image of the target in alignment as angle $e$ changes. Therefore it will be seen that if scale 20 is set to the proper position to indicate the height of the target, H, and if this height does not change, no motion of knob 21 is required to maintain the two portions of the image in coincidence and any change in H is indicated by separation of the images on the two sides of the halving line, which separation can be overcome by longitudinal shifting of wedges 3 and 3a, and the new altitude reading will appear on the scale 20.

It has been pointed out above that when pinion 26 is locked, each position of scale 20 corresponds to a particular value of R, and that when tube 14 is caused to rotate through the angle (90°—$e$) each position of scale 20 corresponds to a particular value of H. It is customary, however, to measure the altitude H in feet and the range R in yards. When the instrument which is illustrated in the accompanying figures is to be used as a rangefinder, tube 14 is locked in such position that the plane of deviation of the prisms 3 and 3a is not parallel to the lines of sight to the target, but makes with the plane containing said lines of sight, an angle whose cosine is equal to one-third. Hence the deviation produced by prisms 3 and 3a, parallel to the dividing line, for any position of scale 20, is equal to one-third of the deviation that would be produced were the plane of deviation of these prisms parallel to the lines of sight to the target. Hence, with tube 14 locked in the position described, each position of scale 20 corresponds to a value of R three times as great as would be the case if the plane of deviation were parallel to the lines of sight. The plane of deviation is in the latter position for a target at 90° elevation, i. e. when R=H, when the instrument is set to measure H. Hence any position on the scale 20 corresponds to a value of R which is three times as great as the value of H to which the same position corresponds. Therefore the same graduations on this scale are used to read both H in feet and R in yards. Hole 33 is so located in frame 24 that when stud 30a is engaged therein, the plane of deviation of prisms 3 and 3a is in the position described above for using the instrument as a rangefinder.

It is desirable and customary to provide instruments of the rangefinder type with some means of adjustment. Such means usually consist of a self-contained adjuster or collimator so designed as to project into prisms 1 and 1a two mutually parallel rays of light, or of a bar provided with two marks exactly the same distance apart as the centers of prisms 1 and 1a. In either case the adjusting device is equivalent to an object at an infinite distance, i. e. so that the angle $b$ is equal to zero. In fact any celestial object, such as the moon or a star, may be used for adjustment. Obviously, when the instrument is to be adjusted by any of these means it is necessary, in order to determine whether it is in proper adjustment, to make the deviation produced by the prisms 3 and 3a parallel to the halving line equal to zero. This can be done by locking tube 14 in such position that the plane of deviation of these prisms is perpendicular to the plane containing the lines of sight to the target, and the hole 32 in frame 24 is so located that when stud 30 is engaged therein, tube 14 is in the proper position for adjustment of the instrument.

The herein described invention may be manufactured and used by or for the Government of the United States of America for governmental purposes without the payment of any royalties thereon or therefor.

I claim:

1. In an optical measuring instrument, a casing having apertures, a shaft on which said casing is rotatably mounted, means to direct light from said apertures toward a common point in said casing, means in the paths of light to form images in a common plane, rotatable means disposed to permit said light to pass through, a refractive element in said means between each aperture and said plane rotatable with said rotatable means, means including an element engageable with said shaft to form a driving connection to rotate said first named means when said shaft is held stationary and said casing is rotated on said shaft, means to view said images, and indicating means associated with said elements whereby a distance is indicated in one unit of length when said elements are in one angular position with respect to the plane of the lines of sight and in another unit when said elements are in another angular position.

2. In an optical measuring instrument, a casing having spaced apertures to admit light thereinto, means to receive light from said apertures and therefrom to form contiguous complementary half-images, refracting means adjustable to overcome relative displacement of said half-images, actuating devices to effect adjustment of said refracting means, an indicating device connected to said actuating device to register distances in a certain unit of length to the object represented by said images, and means to set said refracting means in position so that said distance shall be given in another unit of length.

3. In a combined range and altitude finder, a casing mounted for rotation about an axis, means therein to form contiguous complementary half-images in a common plane, devices in said casing rotationally and translationally movable to overcome relative displacement of said half-images, means comprising a fixed gear segment and meshed therewith a gear segment operatively associated with said devices to impart to said devices a degree of rotation bearing a fixed proportional relation to the rotation of said casing about its axis, means to move said devices translationally, an indicator operatively associated with said last mentioned means to show the distance to the object represented by said images, and means to view said images.

4. In a combined range and altitude finder, a casing mounted for rotation about an axis normal to the longitudinal axis of said casing, means therein to form contiguous complementary half-images in a common plane, devices in said casing rotationally and translationally movable to overcome relative displacement of said images, means comprising a fixed gear segment and meshed therewith a gear segment operatively associated with said devices for rotating said devices so that the relative displacement of said images shall be proportional to a trigonometric function of the angle of rotation of said casing about its axis, and means to impart to said devices movement unrelated to the said rotation about the axis.

5. In a combined range and altitude finder, a casing mounted for rotation about an axis, means therein to form contiguous complementary half-images in a common plane, devices in said casing rotationally and translationally movable to overcome relative displacement of said images, means comprising a segment gear on the fixed mount and a segment gear operatively associated with said devices for rotating said devices so that the relative displacement of said images shall be proportional to the cosine of the angle complementary to the angle of rotation of the casing about its axis, and means to impart to said devices movement unrelated to said rotation about the axis.

6. In a combined range and altitude finder, a casing having spaced apertures for the admission of light thereinto, means to reflect light from said apertures toward an intermediate portion of said casing, means to form contiguous complementary half-images in a common plane, a refracting wedge in the path of the light from each of said apertures to bring about coincidence of said half-images, a rotatable mounting for said wedges in which said wedges are translationally movable, means to move said wedges translationally, an indicating device operatively connected with said last mentioned means to register the distance to the object represented by said imags, a toothed gear element secured to said mounting, a second gear element meshed therewith, manually operable means to actuate said second gear element to rotate said mounting, and means to lock said mounting in a predetermined rotated position.

7. In a combined range and altitude finder, a casing having spaced apertures for admitting light thereinto, said casing being rotatable about an axis transverse to the longitudinal axis thereof, means to reflect light from said apertures toward an intermediate portion of said casing, means to form contiguous complementary half-images in a common plane, a refracting wedge in the path of the light from each of said apertures to bring about coincidence of said half-images, a rotatable mounting for said wedges in which said wedges are translationally movable, means to move said wedges translationally, an indicating device operatively connected with said last mentioned means to register the distance to the object represented by said images, a gear element on said mounting, a second gear element meshed therewith, a shaft on which said second gear element is fixed to rotate with said shaft, a pinion on said shaft, a pin projecting laterally from said pinion, a frame in which said shaft is mounted, said frame having a recess therein facing said pinion and engageable by said pin, means to move said pin into said recess, and indicating means to show when said pin and recess are in the proper relative positions for said pin to enter said recess.

8. In a combined range and altitude finder, a casing having spaced apertures to admit light thereinto, means to reflect light from said apertures toward an intermediate portion of said casing, means to form contiguous complementary half-images in a common plane, a refracting wedge in the path of the light from each of said apertures to bring about coincidence of said half-images, a rotatable mounting for said wedges in which said wedges are translationally movable, means to move said wedges translationally, an indicating device operatively connected with said last mentioned means to register the distance to the object represented by said images, a toothed gear element secured to said mounting, a second gear element meshed therewith, manually operable means to actuate said second gear to rotate said mounting, a pinion having driving connection with said second gear element, a shaft on which said casing is rotatably mounted, means to lock said pinion to said shaft, and means to indicate when said pinion and said shaft are in the locking position.

9. In an optical measuring instrument, a casing having spaced apertures to admit light thereinto, means to form contiguous complementary half-images, refracting means movable either rotationally or spatially to overcome relative displacement of said half-images, an actuating device to effect spatial adjustment of said refracting means, an indicating means operatively connected to said actuating device to show the distance in feet to the object represented by said half-images, and means to rotate said refracting means to and lock them in such position that the distance registered by said indicating means is shown in yards, and means to indicate when said refracting means have been rotated to the position specified.

10. In an optical measuring instrument, a casing having spaced apertures to admit light thereinto, said casing being mounted for rotation about an axis transverse to the longitudinal axis thereof, doubly-reflecting prisms disposed in said casing to reflect the light from said apertures toward an intermediate portion of said casing, means in the paths of said light to form contiguous complementary half-images in a common plane, a refracting wedge in the path of the light from each of said apertures, a rotatable mounting for said wedges in which said wedges are translationally movable, means to move said wedges translationally, an indicating device operatively connected to said wedge-moving means to register the distance to the object represented by the said images, a gear sector on said rotatable mounting, a second gear sector meshed therewith, a shaft on which said second sector is mounted, a frame secured to said casing in which said shaft is supported, said frame having spaced holes therein, a pinion on said shaft, a pin projecting laterally from a face of said pinion selectively engageable with the said holes in said frame, a second shaft on which said casing is rotatable, a second pinion on said second shaft having a hole in the face thereof toward said first mentioned pinion, a second pin on the first mentioned pinion engageable with the hole in the second pinion, a leveling device mounted on the second shaft, a third shaft having an enlarged outer head having a pair of spaced lines thereon, a hollow shaft rotatable on said third shaft having an outer face around said enlarged head and a line on said face, a broad faced pinion on said hollow shaft meshed with the first pinion, a second hollow shaft having a face around the face of the hollow shaft aforesaid and rotatable on the aforesaid hollow shaft, said second hollow shaft having a line on the face thereof, a third pinion on the second hollow shaft meshed with the second pinion, a fourth pinion meshed with the said broad faced pinion, manually operable means to operate said fourth pinion, means to move the pins on said first mentioned pinion into selective engagement with the hole in said frame or either of the holes in said frame, and means to view said images.

11. In an optical measuring instrument, means for forming contiguous complementary half-images, movable elements disposed to deviate the light which forms said images, a mechanism to move said elements so that the deviation produced thereby parallel to the line between said half-images is zero, whereby the adjustment of said instrument may be checked, means to lock said mechanism in the position specified, and an indicator to show when the parts of said mechanism are in the locking position.

12. In an optical measuring instrument, means for forming contiguous complementary half-images in a common plane, rotatable wedges disposed to deviate the light which forms said images, mechanism to rotate said wedges so that the deviation produced thereby is at right angles to the line between said half-images, whereby the adjustment of said instrument may be checked, means to lock the said mechanism when said wedges are rotated as specified, and an indicator to show when the parts of said mechanism are in the locking position.

13. An optical measuring instrument, comprising a tubular enclosing member provided with two spaced apertures to admit light thereinto and mounted for rotation of its longitudinal axis in a vertical plane, a system of elements operatively related to each of said apertures whereby contiguous complementary half-images from said apertures are formed in a common plane, refractive elements movable either rotationally or translationally to overcome relative displacement of said half-images, a telescope associated with said casing to maintain a horizontal line, means operatively connecting said telescope to said refractive elements to rotate said elements when said casing is rotated as aforesaid and said telescope is maintained in a horizontal position, and means to view said images.

LAWRENCE RADFORD.